United States Patent
Kikuchi et al.

(10) Patent No.: US 10,627,234 B2
(45) Date of Patent: Apr. 21, 2020

(54) GYRO SENSOR, ELECTRONIC APPARATUS, AND VEHICLE

(71) Applicant: Seiko Epson Corporation, Tokyo (JP)

(72) Inventors: Takayuki Kikuchi, Chino (JP); Kei Kanemoto, Fujimi (JP)

(73) Assignee: Seiko Epson Corporation (JP)

( * ) Notice: Subject to any disclaimer, the term of this patent is extended or adjusted under 35 U.S.C. 154(b) by 201 days.

(21) Appl. No.: 15/860,909

(22) Filed: Jan. 3, 2018

(65) Prior Publication Data
US 2018/0238688 A1 Aug. 23, 2018

(30) Foreign Application Priority Data

Feb. 20, 2017 (JP) ................................ 2017-028778

(51) Int. Cl.
| | | |
|---|---|---|
| *G01C 19/06* | (2006.01) | |
| *G01P 15/097* | (2006.01) | |
| *G01P 15/09* | (2006.01) | |
| *G01C 19/574* | (2012.01) | |
| *G01C 19/5628* | (2012.01) | |

(52) U.S. Cl.
CPC ......... *G01C 19/065* (2013.01); *G01C 19/574* (2013.01); *G01P 15/097* (2013.01); *G01P 15/0922* (2013.01); *G01C 19/5628* (2013.01)

(58) Field of Classification Search
CPC .................................................. G01C 19/065
USPC ....................................................... 702/147
See application file for complete search history.

(56) References Cited

U.S. PATENT DOCUMENTS

| | | | |
|---|---|---|---|
| 8,479,575 B2* | 7/2013 | Kempe .............. | G01C 19/5747 73/504.12 |
| 2006/0213266 A1 | 9/2006 | French et al. | |
| 2007/0199377 A1* | 8/2007 | Katsumata ......... | G01C 19/5719 73/514.32 |
| 2015/0168437 A1* | 6/2015 | Jomori ............... | G01C 19/5747 73/496 |
| 2015/0212526 A1 | 7/2015 | Kanemoto et al. | |
| 2015/0308828 A1* | 10/2015 | Jomori ............... | G01C 19/5712 73/504.12 |

(Continued)

FOREIGN PATENT DOCUMENTS

| | | |
|---|---|---|
| EP | 2957862 A2 | 12/2015 |
| JP | 2007-304099 A | 11/2007 |

(Continued)

*Primary Examiner* — Ricky Ngon
(74) *Attorney, Agent, or Firm* — Harness, Dickey & Pierce, P.L.C.

(57) ABSTRACT

A gyro sensor includes: a substrate; a first drive section; and a first detection section and a second detection section that detect angular velocity. The first detection section includes a first movable body including a first movable electrode that vibrates by vibration of the first drive section and is displaced in response to the angular velocity, and a first fixed electrode fixed to the substrate and facing the first movable electrode. The second detection section includes a second movable body including a second movable electrode that vibrates by vibration of the first drive section and is displaced in response to the angular velocity, and a second fixed electrode fixed to the substrate and facing the second movable electrode. The first movable body and the second movable body are coupled together by a first coupling section.

11 Claims, 8 Drawing Sheets

(56) References Cited

U.S. PATENT DOCUMENTS

| | | | |
|---|---|---|---|
| 2016/0069685 A1* | 3/2016 | Furuhata | G01C 19/574 73/504.12 |
| 2016/0097642 A1* | 4/2016 | Okami | G01C 19/5747 73/504.12 |
| 2016/0123736 A1* | 5/2016 | Nakagawa | G01C 19/5607 73/504.12 |
| 2016/0126924 A1* | 5/2016 | Nakagawa | H03H 9/21 331/156 |
| 2016/0146605 A1* | 5/2016 | Furuhata | G01C 19/5712 73/504.12 |

FOREIGN PATENT DOCUMENTS

| | | |
|---|---|---|
| JP | 2015-141065 A | 8/2015 |
| JP | 2015-169492 A | 9/2015 |
| JP | 2016-095224 A | 5/2016 |
| JP | 2016-099269 A | 5/2016 |

\* cited by examiner

GYRO SENSOR, ELECTRONIC APPARATUS, AND VEHICLE

BACKGROUND

1. Technical Field

The present invention relates to a gyro sensor, an electronic apparatus, and a vehicle.

2. Related Art

In recent years, a gyro sensor that detects angular velocity using a silicon micro-electro-mechanical system (MEMS) technique has been developed. The use of the gyro sensor for, for example, a camera shake correction function of a digital still camera (DSC), a navigation system of an automobile, and a motion sensing function of a game machine is rapidly expanding.

When angular velocity is applied to the gyro sensor in the state where a movable body vibrates by vibration of a drive section, the movable body is displaced by the Coriolis force and thus the angular velocity can be detected (e.g., see EP 2957862). In the gyro sensor, the S/N ratio (vibration (signal)-to-noise ratio) can be improved by increasing the area of the movable body.

However, when the area of the movable body is increased to improve the S/N ratio in the gyro sensor described above, the movable body is likely to bend and thus the frequency of spurious vibration may approach the frequency of detection vibration of the movable body. The frequency of spurious vibration also fluctuates with ambient temperature. Therefore, when ambient temperature changes in the state where the frequency of spurious vibration approaches the frequency of detection vibration of the movable body, the influence of the temperature on fluctuations in the frequency of spurious vibration becomes great. Therefore, the temperature stability of the gyro sensor may be lowered.

SUMMARY

An advantage of some aspects of the invention is to provide a gyro sensor in which it is possible to reduce the approach of the frequency of spurious vibration to the frequency of detection vibration of a movable body. Another advantage of some aspects of the invention is to provide an electronic apparatus including the gyro sensor. Still another advantage according of some aspects of the invention is to provide a vehicle including the gyro sensor.

The invention can be implemented as the following forms or application examples.

Application Example 1

A gyro sensor according to this application example includes: a substrate; a first drive section; and a first detection section and a second detection section that detect angular velocity, wherein the first detection section includes a first movable body including a first movable electrode that vibrates by vibration of the first drive section and is displaced in response to the angular velocity, and a first fixed electrode fixed to the substrate and facing the first movable electrode, the second detection section includes a second movable body including a second movable electrode that vibrates by vibration of the first drive section and is displaced in response to the angular velocity, and a second fixed electrode fixed to the substrate and facing the second movable electrode, and the first movable body and the second movable body are coupled together by a first coupling section.

In the gyro sensor, bending of the first movable body and the second movable body can be reduced compared to, for example, a gyro sensor including a large movable body having an area equal to the sum of the areas of the first movable body and the second movable body in a plan view, and thus it is possible to reduce the approach of the frequency of spurious vibration to the frequency of detection vibration of the first movable body and the second movable body.

Application Example 2

In the gyro sensor according to the application example, the first movable body and the second movable body may vibrate in phase with each other.

In the gyro sensor with this configuration, the first movable body and the second movable body are coupled together by the first coupling section, and therefore, it is possible to vibrate the first movable body and the second movable body in phase with each other by one driver.

Application Example 3

In the gyro sensor according to the application example, the gyro sensor may further include: a first fixed section, a second fixed section, and a third fixed section that are fixed to the substrate; a first spring section that couples the first fixed section to the first movable body; a second spring section that couples the second fixed section to the first movable body; and a third spring section that couples the third fixed section to the first movable body, and the first spring section may be provided between the second spring section and the third spring section in a plan view.

In the gyro sensor with this configuration, bending of the first movable body can be reduced compared to the case where, for example, the first spring section is not provided.

Application Example 4

In the gyro sensor according to the application example, the first spring section may include a shape that extends, while reciprocating in a first axis direction, in a second axis direction orthogonal to the first axis, and an extending section that is closest to the first fixed section, among a plurality of extending sections of the first spring section that extend in the first axis direction, may at least partially overlap the first fixed section as viewed in the second axis direction and be larger in width in the second axis direction than another extending section.

In the gyro sensor with this configuration, it is possible to reduce breakage of the first spring section due to the collision of the extending section overlapping the first fixed section as viewed in the second axis direction and closest to the first fixed section with the first fixed section.

Application Example 5

In the gyro sensor according to the application example, the first movable body and the second movable body may have the same size and the same shape.

It is sufficient that the gyro sensor is designed so as to avoid one frequency of spurious vibration, and therefore, design flexibility can be increased.

Application Example 6

In the gyro sensor according to the application example, the gyro sensor may further include: a second drive section; and a third movable body and a fourth movable body that vibrate by vibration of the second drive section and are displaced in response to angular velocity, the third movable body and the fourth movable body may be coupled together by a second coupling section, and the first and second movable bodies and the third and fourth movable bodies may vibrate in opposite phase to each other.

Even when, for example, physical quantity such as acceleration other than angular velocity is applied to the gyro sensor, an acceleration component can be canceled out by differential detection, and thus angular velocity can be accurately detected.

Application Example 7

An electronic apparatus according to this application example includes the gyro sensor according to the application example.

The electronic apparatus can include the gyro sensor according to the application example.

Application Example 8

A vehicle according to this application example includes the gyro sensor according to the application example.

The vehicle can include the gyro sensor according to the application example.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the drawings. The embodiments described below do not unduly limit the details of the invention set forth in the appended claims. Moreover, not all of the configurations described below are indispensable configuration requirements of the invention.

1. Gyro Sensor

Figure 1:
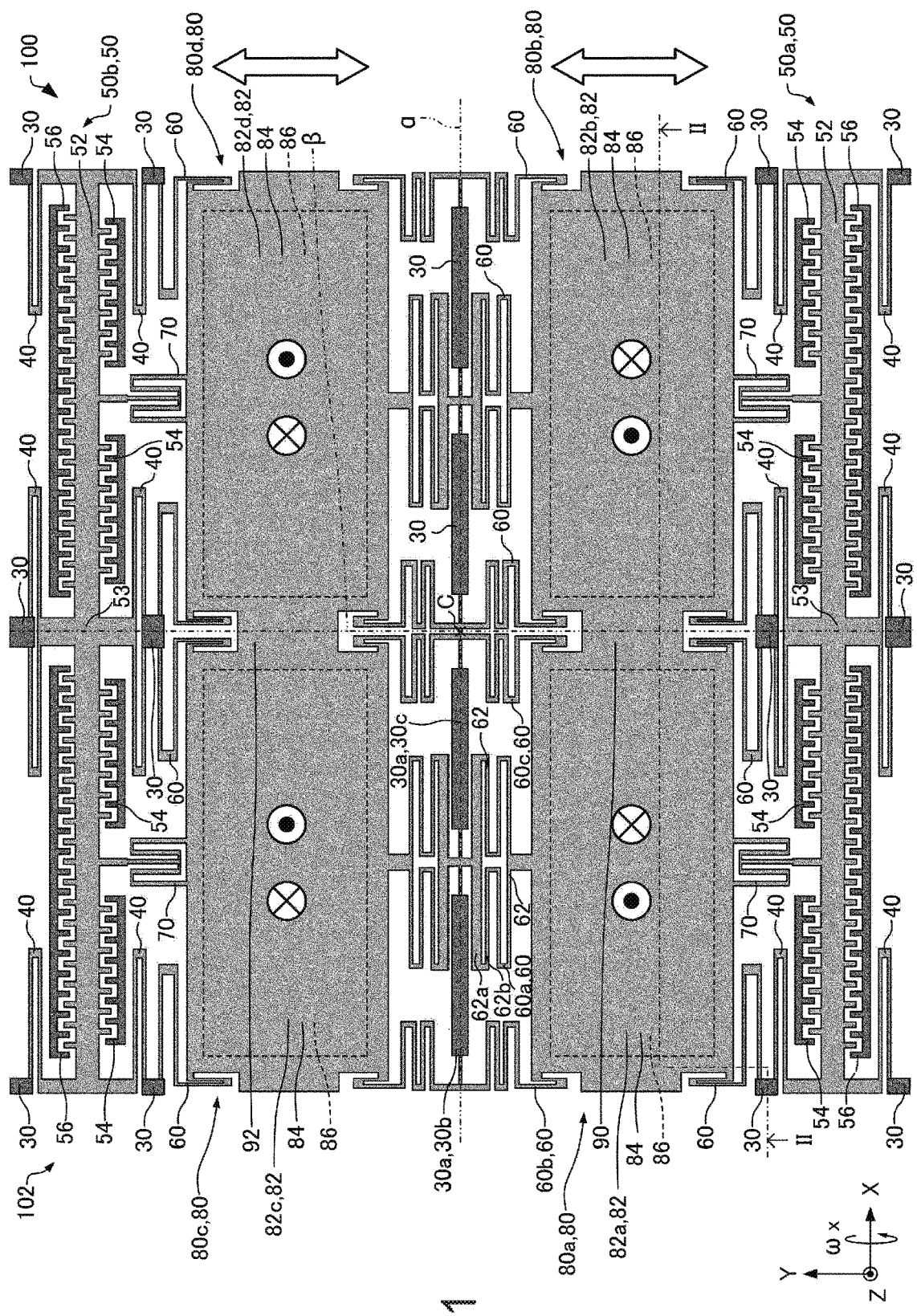
FIG. 1 is a plan view schematically showing a gyro sensor according to an embodiment.
Figure 2:
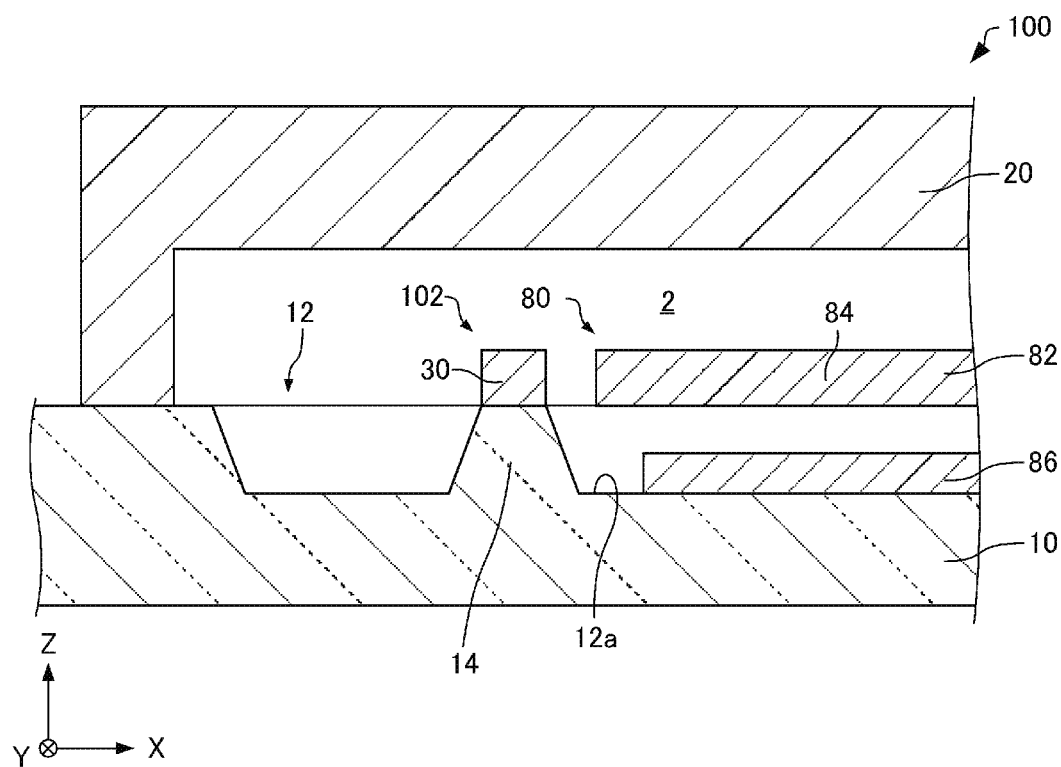
FIG. 2 is a cross-sectional view schematically showing the gyro sensor according to the embodiment.

First, a gyro sensor according to an embodiment will be described with reference to the drawings. FIG. 1 is a plan view schematically showing the gyro sensor 100 according to the embodiment. FIG. 2 is a cross-sectional view schematically showing the gyro sensor 100 according to the embodiment, taken along line II-II of FIG. 1. In FIGS. 1 and 2, the X-axis, the Y-axis, and the Z-axis are shown as three axes orthogonal to each other.

As shown in FIGS. 1 and 2, the gyro sensor 100 includes a substrate 10, a lid 20, and a functional element 102. In FIG. 1, the substrate 10 and the lid 20 are not shown for convenience sake.

The material of the substrate 10 is, for example, glass or silicon. A recess 12 is provided in the substrate 10. The recess 12 constitutes a cavity 2. The substrate 10 includes a post section 14 provided on a bottom surface (a surface of the substrate 10 that defines the recess 12) 12*a* of the recess 12. The post section 14 is a member for supporting the functional element 102.

The lid 20 is provided on the substrate 10 (on the +Z-axis direction side of the substrate 10). The material of the lid 20 is, for example, silicon. The substrate 10 and the lid 20 may be bonded together by anodic bonding. In the illustrated example, a recess is formed in the lid 20, and the recess constitutes the cavity 2.

The method of bonding the substrate 10 to the lid 20 is not particularly limited. For example, the substrate 10 and the lid 20 may be bonded together with a low-melting-point glass (glass paste) or solder. Alternatively, the substrate 10 and the lid 20 may be bonded together by forming metal thin films (not shown) on the bonding portions of the substrate 10 and the lid 20 and eutectically bonding the metal thin films together.

The functional element 102 is bonded to the substrate 10 by, for example, anodic bonding. The functional element 102 is accommodated in the cavity 2 formed by the substrate 10 and the lid 20. It is desirable that the cavity 2 is in a reduced-pressure state. With this configuration, it is possible to reduce the attenuation of vibration of the functional element 102 due to the viscosity of air.

The functional element 102 includes, for example, fixed sections 30, drive spring sections 40, drive sections 50, detection spring sections 60, coupling spring sections 70, detection sections 80, a first coupling section 90, and a second coupling section 92.

The fixed section 30 is fixed to the substrate 10. The fixed section 30 is bonded to the post section 14 of the substrate 10 by, for example, anodic bonding. The fixed section 30 is connected to at least one of the drive spring section 40 and the detection spring section 60. A plurality of the fixed sections 30 are provided. In the illustrated example, the planar shape (a shape as viewed in the Z-axis direction) of the fixed section 30 is quadrilateral.

The drive spring section 40 couples the fixed section 30 to a movable drive electrode 52 of the drive section 50. The drive spring section 40 is provided spaced apart from the substrate 10. In the illustrated example, the drive spring section 40 extends in the Y-axis direction while reciprocating in the X-axis direction. The drive spring section 40 can smoothly expand and contract in the Y-axis direction, which is the vibration direction (the vibration direction of the movable drive electrode 52) of the drive section 50.

The drive section 50 vibrates a movable body 82 of the detection section 80 in the Y-axis direction. A plurality of the drive sections 50 are provided. In the illustrated example, two drive sections 50 are provided (a first drive section 50*a* and a second drive section 50*b*). For example, the detection section 80 is provided between the first drive section 50*a* and the second drive section 50*b*. In the illustrated example, the first drive section 50*a* is provided on the −Y-axis direction side of the second drive section 50*b*. The drive section 50 includes, for example, the movable drive electrode 52 and fixed drive electrodes 54 and 56.

The movable drive electrode 52 is provided spaced apart from the substrate 10. The movable drive electrode 52 has, for example, a comb teeth-like shape including a trunk section extending in the X-axis direction and a plurality of branch sections extending in the Y-axis direction from the trunk section. In the illustrated example, the movable drive electrode 52 is supported by six drive spring sections 40. Specifically, the four corners of the movable drive electrode 52 are connected with the drive spring sections 40, and further, a middle section 53 of the movable drive electrode 52 is connected with two drive spring sections 40. Therefore, compared to the case where only the four corners of the movable drive electrode 52 are connected with the drive spring sections 40, the movable drive electrode 52 is less likely to bend, and thus, for example, spurious vibration is less likely to be generated.

The fixed drive electrodes 54 and 56 are fixed to the substrate 10. The fixed drive electrodes 54 and 56 are bonded to the post section (not shown) of the substrate 10 by, for example, anodic bonding. The fixed drive electrodes 54 and 56 are provided to face the movable drive electrode 52. That is, the fixed drive electrode 54 and the movable drive electrode 52 form a capacitance, and the fixed drive electrode 56 and the movable drive electrode 52 form a capacitance. In the first drive section 50*a*, the fixed drive electrode 54 is provided on the +Y-axis direction side of the movable drive electrode 52, and the fixed drive electrode 56 is provided on the −Y-axis direction side of the movable drive electrode 52. In the second drive section 50*b*, the fixed drive electrode 54 is provided on the −Y-axis direction side of the movable drive electrode 52, and the fixed drive electrode 56 is provided on the +Y-axis direction side of the movable drive electrode 52. The fixed drive electrodes 54 and 56 have, for example, a comb teeth-like shape corresponding to the movable drive electrode 52.

The detection spring section 60 couples the fixed section 30 to the movable body 82 of the detection section 80. The detection spring section 60 is provided spaced apart from the substrate 10. The detection spring section 60 is configured to be displaceable in the Z-axis direction in response to the displacement of the movable body 82 in the Z-axis direction.

A plurality of the detection spring sections 60 are provided. A first detection spring section (a first spring section) 60*a* of the plurality of detection spring sections 60 is connected to a first fixed section (a first fixed section of the plurality of fixed sections 30) 30*a*. The first detection spring section 60*a* couples the first fixed section 30*a* to the movable body 82. A second detection spring section (a second spring section) 60*b* of the plurality of detection spring sections 60 couples a second fixed section (a second fixed section of the plurality of fixed sections 30) 30*b* to the movable body 82. A third detection spring section (a third spring section) 60*c* of the plurality of detection spring sections 60 couples a third fixed section (a third fixed section of the plurality of fixed sections 30) 30*c* to the movable body 82.

In the illustrated example, two first fixed sections 30*a* are provided. One of the first fixed sections 30*a* and the second fixed section 30*b* are integrally provided, and the other first fixed section 30*a* and the third fixed section 30*c* are integrally provided. The first detection spring section 60*a* is provided between the second detection spring section 60*b* and the third detection spring section 60*c* in a plan view (as viewed in the Z-axis direction). Although not illustrated, the fixed sections 30*a*, 30*b*, and 30*c* may be provided independently of each other. Moreover, the number of the fixed sections 30*a*, 30*b*, and 30*c* is not particularly limited.

The first detection spring section 60*a* has a shape extending in the Y-axis direction orthogonal to the X-axis while reciprocating in the X-axis direction. The first detection spring section 60*a* includes a plurality of extending sections 62 extending in the X-axis direction. The extending section 62 (the extending section 62 that includes a portion overlapping the first fixed section 30*a*) that overlaps the first fixed section 30*a* as viewed in the Y-axis direction and is closest to the first fixed section 30*a* (i.e., an extending section 62*a* in the illustrated example) among the plurality of extending sections 62 is wider (larger in size in the Y-axis direction) than another extending section 62 (e.g., an extending section 62*b*). The extending section 62*a* includes a face that faces a face of the first fixed section 30*a*. The extending section 62*a*, which is spaced apart from the first fixed section 30*a* and is closest to the first fixed section 30*a* among the plurality of extending sections 62 of the first detection spring section 60*a* extending in the X-axis direction, at least partially overlaps the first fixed section 30*a* as viewed in the Y-axis direction and is larger in width in the Y-axis direction than another extending section 62 (e.g., the extending section 62*b*) among the plurality of extending sections 62.

The coupling spring section 70 couples the movable drive electrode 52 of the drive section 50 to the movable body 82 of the detection section 80. The coupling spring section 70 is provided spaced apart from the substrate 10. The coupling spring section 70 is configured to be displaceable in the Z-axis direction in response to the displacement of the movable body 82 in the Z-axis direction. The coupling spring section 70 transmits vibration of the movable drive electrode 52 of the drive section 50 in the Y-axis direction to the movable body 82 of the detection section 80. With this configuration, the movable body 82 can vibrate in the Y-axis direction.

The detection section 80 detects angular velocity. The detection section 80 includes, for example, the movable body 82 and a fixed detection electrode (a fixed electrode) 86.

The movable body 82 vibrates in the Y-axis direction by vibration of the drive section 50, and is displaced in the Z-axis direction in response to angular velocity. The movable body 82 is provided spaced apart from the substrate 10. The movable body 82 is a portion whose four corners are supported by the detection spring sections 60. That is, the four corners of the movable body 82 are connected with the detection spring sections 60. The movable body 82 includes a movable detection electrode (a movable electrode) 84. The movable detection electrode 84 is a portion of the movable body 82 that overlaps the fixed detection electrode 86 in the plan view. In the illustrated example, the planar shape of the movable detection electrode 84 is rectangular. The movable detection electrode 84 vibrates in the Y-axis direction by vibration of the drive section 50, and is displaced in the Z-axis direction in response to angular velocity.

The fixed detection electrode 86 is fixed to the substrate 10. The fixed detection electrode 86 is provided to face the movable detection electrode 84. That is, the fixed detection electrode 86 and the movable detection electrode 84 form a capacitance.

A plurality of the detection sections 80 are provided. In the illustrated example, four detection sections 80 are provided (a first detection section 80a, a second detection section 80b, a third detection section 80c, and a fourth detection section 80d). The first detection section 80a is provided on, for example, the −X-axis direction side of the second detection section 80b, on the −Y-axis direction side of the third detection section 80c. The fourth detection section 80d is provided on, for example, the +Y-axis direction side of the second detection section 80b, on the +X-axis direction side of the third detection section 80c.

The movable body 82 (a first movable body 82a) of the first detection section 80a vibrates by driving of the first drive section 50a. The fixed detection electrode (a first fixed electrode) 86 of the first detection section 80a faces the movable detection electrode (a first movable electrode) 84 of the first detection section 80a. The movable body 82 (a second movable body 82b) of the second detection section 80b vibrates by driving of the first drive section 50a. The drive section for vibrating the first movable body 82a is commonly used for driving the second movable body 82b. The fixed detection electrode (a second fixed electrode) 86 of the second detection section 80b faces the movable detection electrode (a second movable electrode) 84 of the second detection section 80b. The movable body 82 (a third movable body 82c) of the third detection section 80c vibrates by driving of the second drive section 50b. The movable body 82 (a fourth movable body 82d) of the fourth detection section 80d vibrates by driving of the second drive section 50b. The drive section for vibrating the third movable body 82c is commonly used for driving the fourth movable body 82d.

The first coupling section 90 couples the first movable body 82a to the second movable body 82b. That is, the first movable body 82a and the second movable body 82b are coupled together by the first coupling section 90. The second coupling section 92 couples the third movable body 82c to the fourth movable body 82d. That is, the third movable body 82c and the fourth movable body 82d are coupled together by the second coupling section 92. In the illustrated example, the planar shape of the coupling sections 90 and 92 is rectangular. In the plan view, the size of the coupling sections 90 and 92 in the Y-axis direction is smaller than the size of the movable detection electrode 84 in the Y-axis direction, and is smaller than the size of the movable body 82 in the Y-axis direction.

The first movable body 82a and the third movable body 82c are coupled together by, for example, the detection spring sections 60. The second movable body 82b and the fourth movable body 82d are coupled together by, for example, the detection spring sections 60.

The first movable body 82a and the second movable body 82b vibrate in phase with each other. That is, for example, when the first movable body 82a is displaced to the +X-axis direction side, the second movable body 82b is also displaced to the +X-axis direction side. The first coupling section 90 vibrates as the movable bodies 82a and 82b vibrate. The third movable body 82c and the fourth movable body 82d vibrate in phase with each other. The second coupling section 92 vibrates as the movable bodies 82c and 82d vibrate.

The first and second movable bodies 82a and 82b and the third and fourth movable bodies 82c and 82d vibrate in opposite phase to each other. That is, for example, when the first movable body 82a and the second movable body 82b are displaced to the +X-axis direction side, the third movable body 82c and the fourth movable body 82d are displaced to the −X-axis direction side.

The first movable body 82a, the second movable body 82b, the third movable body 82c, and the fourth movable body 82d have the same size and the same shape. The functional element 102 may have a shape symmetrical about an imaginary straight line α passing through a center C of the functional element 102 and parallel to the X-axis in the plan view. The functional element 102 may have a shape symmetrical about an imaginary straight line β passing through the center C of the functional element 102 and parallel to the Y-axis in the plan view.

The fixed section 30, the spring sections 40, 60, and 70, the movable drive electrode 52, the movable body 82, and the coupling sections 90 and 92 of the functional element 102 are integrally provided. The material of the fixed section 30, the spring sections 40, 60, and 70, the drive section 50, the movable body 82, and the coupling sections 90 and 92 is, for example, silicon doped with an impurity such as phosphorus or boron to provide conductivity. The material of the fixed detection electrode 86 is, for example, aluminum, gold, platinum, or indium tin oxide (ITO). With the use of a transparent electrode material such as ITO as the fixed detection electrode 86, a foreign substance or the like present on the fixed detection electrode 86 can be visually recognized easily from the lower surface side of the substrate 10.

Next, operation of the gyro sensor 100 will be described.

When a voltage is applied between the movable drive electrode 52 and the fixed drive electrodes 54 and 56 with a power source (not shown), an electrostatic force can be generated between the movable drive electrode 52 and the fixed drive electrodes 54 and 56. With this configuration, the drive section 50 can vibrate the movable body 82 in the Y-axis direction.

In the first drive section 50a, as shown in FIG. 1, the fixed drive electrode 54 is provided on the +Y-axis direction side of the movable drive electrode 52, and the fixed drive electrode 56 is provided on the −Y-axis direction side of the movable drive electrode 52. In the second drive section 50b, the fixed drive electrode 54 is provided on the −Y-axis direction side of the movable drive electrode 52, and the fixed drive electrode 56 is provided on the +Y-axis direction side of the movable drive electrode 52. Therefore, by applying a first alternating voltage between the movable drive electrode 52 and the fixed drive electrode 54 and applying a second alternating voltage that is shifted in phase by 180 degrees with respect to the first alternating voltage between the movable drive electrode 52 and the fixed drive electrode 56, the first and second movable bodies 82a and 82b and the third and fourth movable bodies 82c and 82d can be vibrated (vibrated in a tuning fork-like manner) in the Y-axis direction in opposite phase to each other at a predetermined frequency.

When angular velocity ωx about the X-axis is applied to the gyro sensor 100 in the state where the movable bodies 82a, 82b, 82c, and 82d perform the above vibration, the Coriolis force acts on the gyro sensor 100 and thus the first and second movable bodies 82a and 82b and the third and fourth movable bodies 82c and 82d are displaced in opposite directions in the Z-axis direction. The movable bodies 82a, 82b, 82c, and 82d repeat this operation (perform detection vibration) while being subjected to the Coriolis force.

With the displacement of the movable bodies 82a, 82b, 82c, and 82d in the Z-axis direction in response to the Coriolis force, the distance between the movable detection electrode 84 and the fixed detection electrode 86 changes. Therefore, the capacitance between the movable detection electrode 84 and the fixed detection electrode 86 changes. The angular velocity ωx about the X-axis can be obtained by detecting the amount of change in the capacitance between the movable detection electrode 84 and the fixed detection electrode 86.

Although the form (electrostatic driving system) in which the movable body 82 is vibrated by an electrostatic force has been described above, the method of driving the movable body 82 is not particularly limited. A piezoelectric driving system, an electromagnetic driving system using the Lorentz force in a magnetic field, and the like can be applied to the driving method.

The gyro sensor 100 has, for example, the following features.

In the gyro sensor 100, the first movable body 82a of the first detection section 80a includes the movable detection electrode (a first movable detection electrode) 84 that vibrates by vibration of the first drive section 50a and is displaced in response to angular velocity. The second movable body 82b of the second detection section 80b includes the movable detection electrode (a second movable detection electrode) 84 that vibrates by vibration of the first drive section 50a and is displaced in response to angular velocity. The first movable body 82a and the second movable body 82b are coupled together by the first coupling section 90. In the gyro sensor 100, therefore, bending of the first movable body 82a and the second movable body 82b can be suppressed compared to, for example, a gyro sensor including a large movable body having an area equal to the sum of the areas of the first movable body 82a and the second movable body 82b in the plan view, and thus it is possible to reduce the approach of the frequency of spurious vibration to the frequency of detection vibration (vibration due to the Coriolis force or vibration in the Z-axis direction in the illustrated example) of the movable bodies 82a and 82b. Hence, the gyro sensor 100 can have high temperature stability.

The "spurious vibration" as used herein means unwanted vibration at a frequency different from that of the drive vibration (vibration of the movable body by the drive section) of the movable body and that of the detection vibration thereof. The frequency of spurious vibration is designed so as to be sufficiently higher than, for example, the frequency of detection vibration of the movable body. However, when the frequency of spurious vibration is lowered, because of bending of the movable body or the like, to approach that of detection vibration, the angular velocity may not be accurately detected. The gyro sensor 100 can avoid such a problem and thus accurately detect the angular velocity.

Figure 3:
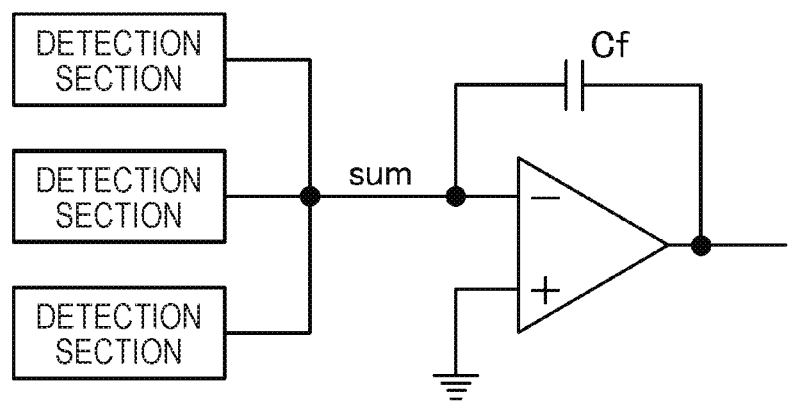
FIG. 3 is a diagram for explaining the connection between detection sections and a QV amplifier.
Figure 4:
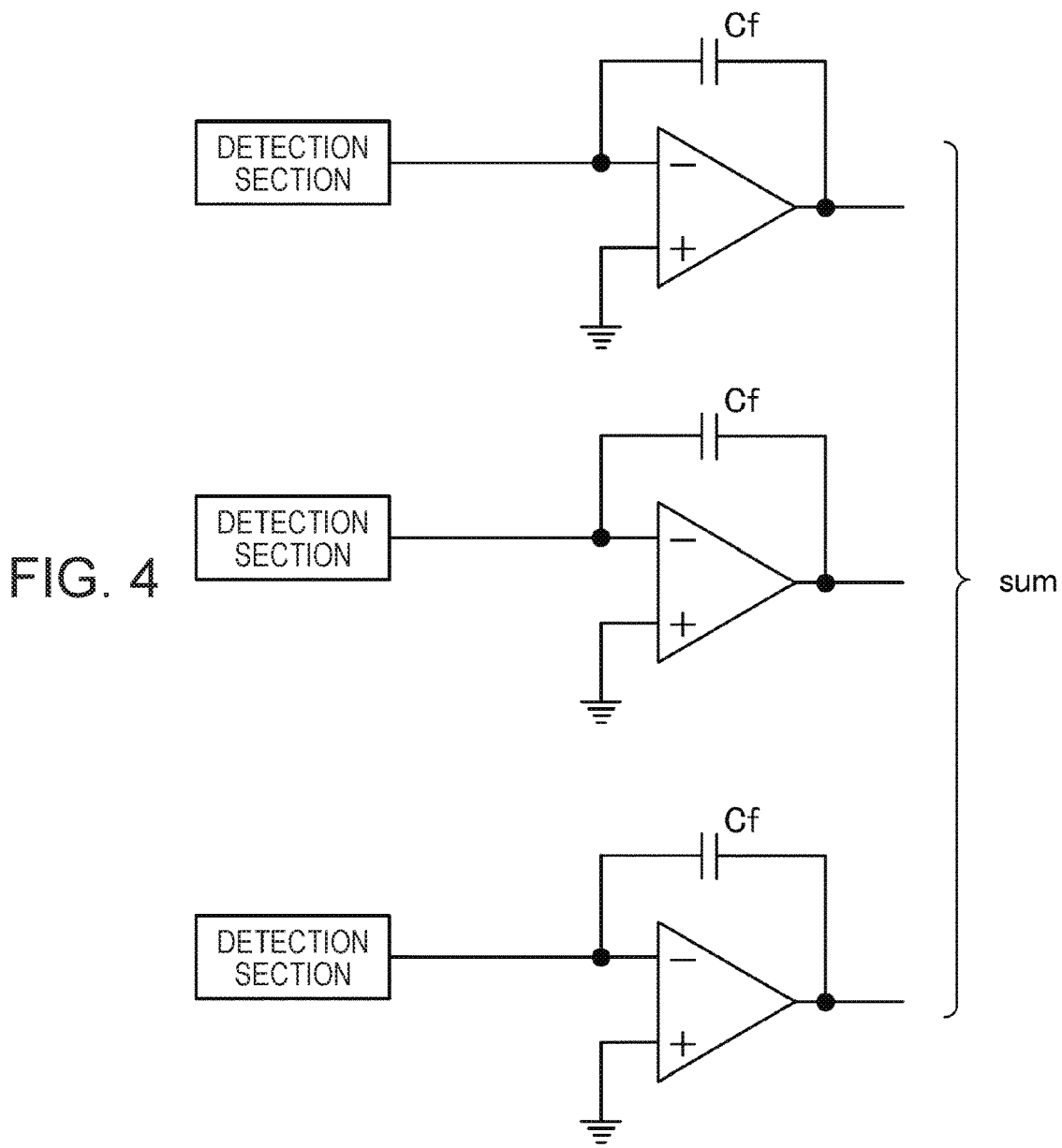
FIG. 4 is a diagram for explaining the connection between detection sections and QV amplifiers.

Further, signals output from the plurality of detection sections 80 are received by one QV amplifier (charge-voltage conversion amplifier) in the gyro sensor 100, and it is therefore possible to improve the S/N ratio. As shown in FIG. 3, when the noise generated by one QV amplifier is N and the detection signal charge generated from a single detection section (e.g., the first detection section) is S, the sum of the detection signal charges from n (a plurality of) detection sections (e.g., the first, second, and third detection sections) is n×S detection signal charges; therefore, the S/N ratio is improved n times. However, when the QV amplifier is connected to each of the detection sections (e.g., the first, second, and third detection sections) as shown in FIG. 4, the S/N ratio of a signal from each of the detection sections does not change; further, even when outputs from the QV amplifiers are summed up, the S/N ratio is improved only √n times, which is the root-mean-square.

In the gyro sensor 100, the first movable body 82a and the second movable body 82b vibrate in phase with each other. In the gyro sensor 100, the first movable body 82a and the second movable body 82b are coupled together by the first coupling section 90, and therefore, the first movable body 82a and the second movable body 82b can be vibrated in phase with each other by one drive section 50a.

The gyro sensor 100 includes the first detection spring section 60a coupling the first fixed section 30a to the first movable body 82a, the second detection spring section 60b coupling the second fixed section 30b to the first movable body 82a, and the third detection spring section 60c coupling the third fixed section 30c to the first movable body 82a. The first detection spring section 60a is provided between the second detection spring section 60b and the third detection spring section 60c in the plan view. Therefore, bending of the first movable body 82a can be reduced in the gyro sensor 100 compared to the case where, for example, the first detection spring section 60a is not provided.

In the gyro sensor 100, the first detection spring section 60a has a shape extending in a second axis direction (the Y-axis direction) orthogonal to the X-axis while reciprocating in a first axis direction (the X-axis direction). The extending section 62a, which is spaced apart from the first fixed section 30a and closest to the first fixed section 30a among the plurality of extending sections 62 of the first detection spring section 60a extending in the X-axis direction, at least partially overlaps the first fixed section 30a as viewed in the Y-axis direction and is larger in width in the Y-axis direction than another extending section 62 among the plurality of extending sections 62. In the gyro sensor 100, therefore, the extending section 62a can be less likely to be displaced in the Y-axis direction, and it is possible to reduce breakage of the first detection spring section 60a due to, for example, the collision of the extending section 62a with the first fixed section 30a.

In the gyro sensor 100, the first movable body 82a and the second movable body 82b have the same size and the same shape. Therefore, even if spurious vibration is generated in the first movable body 82a and the second movable body 82b in the gyro sensor 100, the frequency of spurious vibration generated in the first movable body 82a can be made the same as the frequency of spurious vibration generated in the second movable body 82b. Hence, it is sufficient that the gyro sensor 100 is designed so as to avoid one frequency of spurious vibration, and therefore, design flexibility can be increased. For example, when the frequency of spurious vibration generated in the first movable body 82a is different from the frequency of spurious vibration generated in the second movable body 82b, the gyro sensor 100 has to be designed so as to avoid two frequencies of spurious vibration, and accordingly, design flexibility is lowered.

In the gyro sensor 100, the third movable body 82c and the fourth movable body 82d are coupled together by the second coupling section 92, and the first and second movable bodies 82a and 82b and the third and fourth movable bodies 82c and 82d vibrate in opposite phase to each other.

Therefore, when, for example, physical quantity such as acceleration other than angular velocity is applied to the gyro sensor 100, an acceleration component can be canceled out by differential detection, and thus angular velocity can be detected more accurately.

Although an example of including four detection sections 80 has been described above, the number of the detection sections 80 is not particularly limited as long as the number of the detection sections 80 is more than one. For example, a gyro sensor according to the invention may include a total of 32 detection sections 80 in two rows arranged in the Y-axis direction, with each row including 16 detection sections 80 arranged in the X-axis direction.

2. Method of Manufacturing Gyro Sensor

Figure 5:
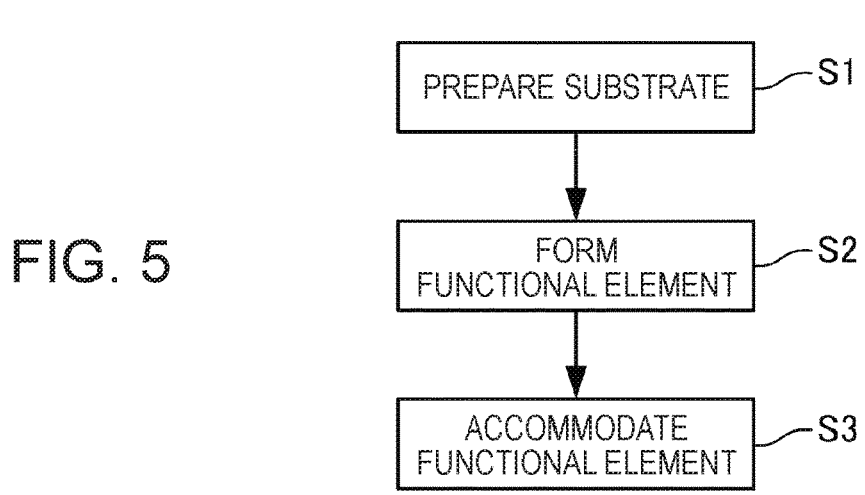
FIG. 5 is a flowchart for explaining a method of manufacturing the gyro sensor according to the embodiment.
Figure 6:
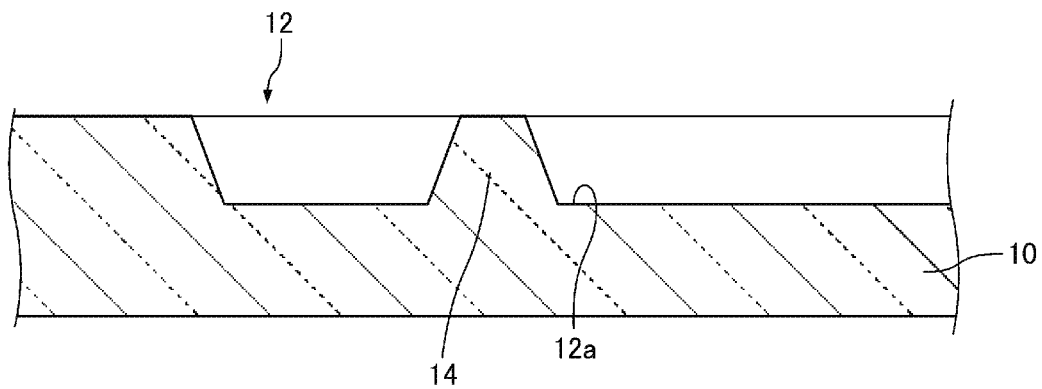
FIG. 6 is a cross-sectional view schematically showing the manufacturing process of the gyro sensor according to the embodiment.
Figure 7:
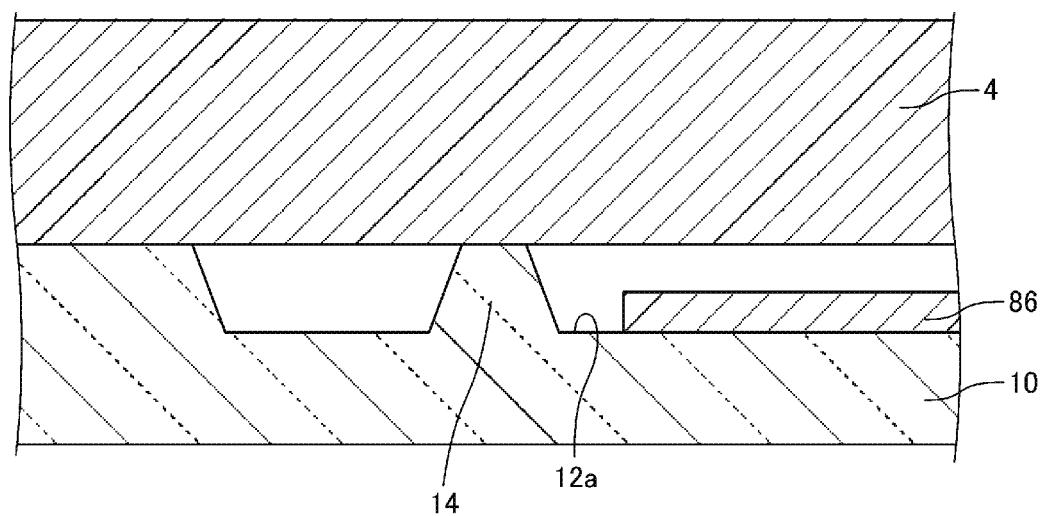
FIG. 7 is a cross-sectional view schematically showing the manufacturing process of the gyro sensor according to the embodiment.

Next, a method of manufacturing the gyro sensor 100 according to the embodiment will be described with reference to the drawings. FIG. 5 is a flowchart for explaining the method of manufacturing the gyro sensor 100 according to the embodiment. FIGS. 6 and 7 are cross-sectional views schematically showing the manufacturing process of the gyro sensor 100 according to the embodiment.

First, as shown in FIG. 6, the substrate 10 provided with the recess 12 and the post section 14 is prepared (Step S1). Specifically, for example a glass substrate is prepared, and the glass substrate is patterned to form the recess 12 and the post section 14. Patterning is performed by, for example, photolithography and etching. With this patterning, the substrate 10 provided with the recess 12 and the post section 14 can be obtained.

Next, the functional element 102 is formed on the substrate 10 (Step S2). Specifically, first, the fixed detection electrode 86 is formed on the bottom surface 12a of the recess 12. The fixed detection electrode 86 is formed by, for example, depositing a conductive layer (not shown) by a sputtering method or a chemical vapor deposition (CVD) method, and then patterning the conductive layer by photolithography and etching.

As shown in FIG. 7, a silicon substrate 4 is bonded to the substrate 10. The bonding of the silicon substrate 4 to the substrate 10 is performed by, for example, anodic bonding. With this bonding, the substrate 10 and the silicon substrate 4 can be firmly bonded together.

Next, the silicon substrate 4 is ground by, for example, a grinding machine to a thin film, and then patterned into a predetermined shape to form the functional element 102. Patterning is performed by photolithography and etching (dry etching), and a Bosch method can be used as specific etching. Through the process described above, the functional element 102 can be formed.

As shown in FIG. 2, the substrate 10 and the lid 20 are bonded together, and the functional element 102 is accommodated in the cavity 2 formed by the substrate 10 and the lid 20 (Step S3). The bonding of the substrate 10 to the lid 20 is performed by, for example, anodic bonding. With this bonding, the substrate 10 and the lid 20 can be firmly bonded together.

Through the process described above, the gyro sensor 100 can be manufactured.

3. Modified Example

Figure 8:
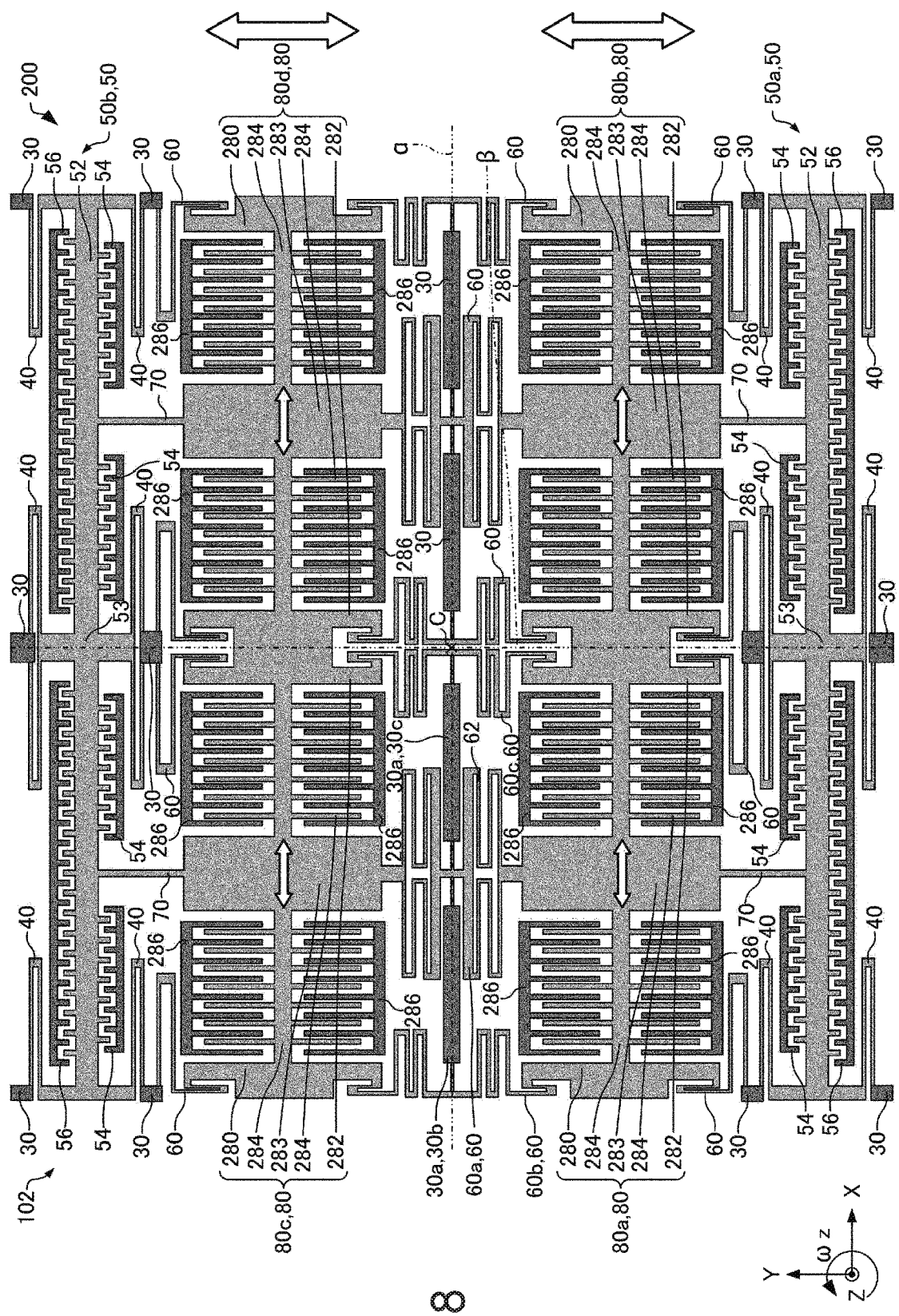
FIG. 8 is a plan view schematically showing a gyro sensor according to a modified example of the embodiment.

Next, a gyro sensor 200 according to a modified example of the embodiment will be described with reference to the drawing. FIG. 8 is a plan view schematically showing the gyro sensor 200 according to the modified example of the embodiment. For convenience sake, the substrate 10 and the lid 20 are not shown in FIG. 8. Moreover, the X-axis, the Y-axis, and the Z-axis are shown as three axes orthogonal to each other in FIG. 8.

In the gyro sensor 200 according to the modified example of the embodiment, members having functions similar to those of the constituent members of the gyro sensor 100 according to the embodiment described above are denoted by the same reference numerals and signs, and the detailed description thereof is omitted.

In the gyro sensor 100 described above, as shown in FIG. 1, the movable body 82 vibrates in the Y-axis direction by vibration of the drive section 50 and is displaced in the Z-axis direction in response to angular velocity, so that the angular velocity about the X-axis can be detected. In contrast, in the gyro sensor 200 as shown in FIG. 8, the movable body 82 vibrates in the Y-axis direction by vibration of the drive section 50 and is displaced in the X-axis direction in response to angular velocity, so that the angular velocity about the Z-axis can be detected.

In the gyro sensor 200, the movable body 82 includes, for example, a first spring connection section 280, a second spring connection section 282, a middle section 283, and movable detection electrodes 284.

Each of the first spring connection section 280 and the second spring connection section 282 is connected to two detection spring sections 60. The four corners of the movable body 82 are connected with the detection spring sections 60. The first spring connection section 280 is located on the −X-axis direction side of the second spring connection section 282. In the illustrated example, the size of the first spring connection section 280 in the Y-axis direction is the same as the size of the second spring connection section 282 in the Y-axis direction. The second spring connection section 282 of the first movable body 82a and the first spring connection section 280 of the second movable body 82b are coupled together by the first coupling section 90. The size of the first coupling section 90 in the Y-axis direction is smaller than the size of the spring connection sections 280 and 282 in the Y-axis direction. The second spring connection section 282 of the third movable body 82c and the first spring connection section 280 of the fourth movable body 82d are coupled together by the second coupling section 92. The size of the second coupling section 92 in the Y-axis direction is smaller than the size of the spring connection sections 280 and 282 in the Y-axis direction. In the illustrated example, the planar shape of the coupling sections 90 and 92 is rectangular.

The middle section 283 is located between the first spring connection section 280 and the second spring connection section 282. The middle section 283 is connected to the detection spring section 60 and the coupling spring section 70. The planar shape of the middle section 283 is, for example, rectangular. In the illustrated example, the size of the middle section 283 in the Y-axis direction is the same as the size of the spring connection sections 280 and 282 in the Y-axis direction.

Two movable detection electrodes 284 are provided in one movable body 82. One of the movable detection electrodes 284 couples the first spring connection section 280 to the middle section 283. The other movable detection electrode 284 couples the second spring connection section 282 to the middle section 283. The movable detection electrode 284 has a comb teeth-like shape including a trunk section extending in the X-axis direction and a plurality of branch sections extending in the Y-axis direction from the trunk section. The branch section includes a portion that overlaps a fixed detection electrode 286 as viewed in the X-axis direction. That is, the branch section includes a portion that faces the fixed detection electrode 286. The movable detection electrode 284 vibrates in the Y-axis direction by vibration of the drive section 50 and is displaced in the X-axis direction in response to angular velocity.

The fixed detection electrode 286 is fixed to the substrate 10. The fixed detection electrode 286 is bonded to the post section (not shown) of the substrate 10 by, for example, anodic bonding. The fixed detection electrode 286 has, for example, a comb teeth-like shape corresponding to the movable detection electrode 284. In the illustrated example, four fixed detection electrodes 286 are provided in one movable body 82. The material of the fixed detection electrode 286 is, for example, silicon doped with an impurity such as phosphorus or boron to provide conductivity.

In the gyro sensor 200, the drive section 50 can vibrate the first and second movable bodies 82a and 82b and the third and fourth movable bodies 82c and 82d in the Y-axis direction in opposite phase to each other at a predetermined frequency.

When angular velocity ωz about the Z-axis is applied to the gyro sensor 200 in the state where the movable bodies 82a, 82b, 82c, and 82d perform the above vibration, the Coriolis force acts on the gyro sensor 200 and thus the first and second movable bodies 82a and 82b and the third and fourth movable bodies 82c and 82d are displaced in opposite directions in the X-axis direction. The movable bodies 82a, 82b, 82c, and 82d repeat this operation (perform detection vibration) while being subjected to the Coriolis force.

With the displacement of the movable bodies 82a, 82b, 82c, and 82d in the X-axis direction, the distance between the movable detection electrode 284 and the fixed detection electrode 286 changes in response to the Coriolis force. Therefore, the capacitance between the movable detection electrode 284 and the fixed detection electrode 286 changes in response to the Coriolis force. The angular velocity ωz about the Z-axis can be obtained by detecting the amount of change in the capacitance between the movable detection electrode 284 and the fixed detection electrode 286.

In the gyro sensor 200, advantageous effects similar to those of the gyro sensor 100 can be obtained. Further, the angular velocity about the Z-axis can be detected in the gyro sensor 200.

In the gyro sensor 200, the detection spring section 60 can smoothly expand and contract in the X-axis direction, which is the vibration direction of the movable body 82. Moreover, the detection spring section 60 may not be configured to be displaceable in the Z-axis direction. Moreover, the coupling spring section 70 may not be configured to be displaceable in the Z-axis direction.

4. Electronic Apparatus

Figure 9:
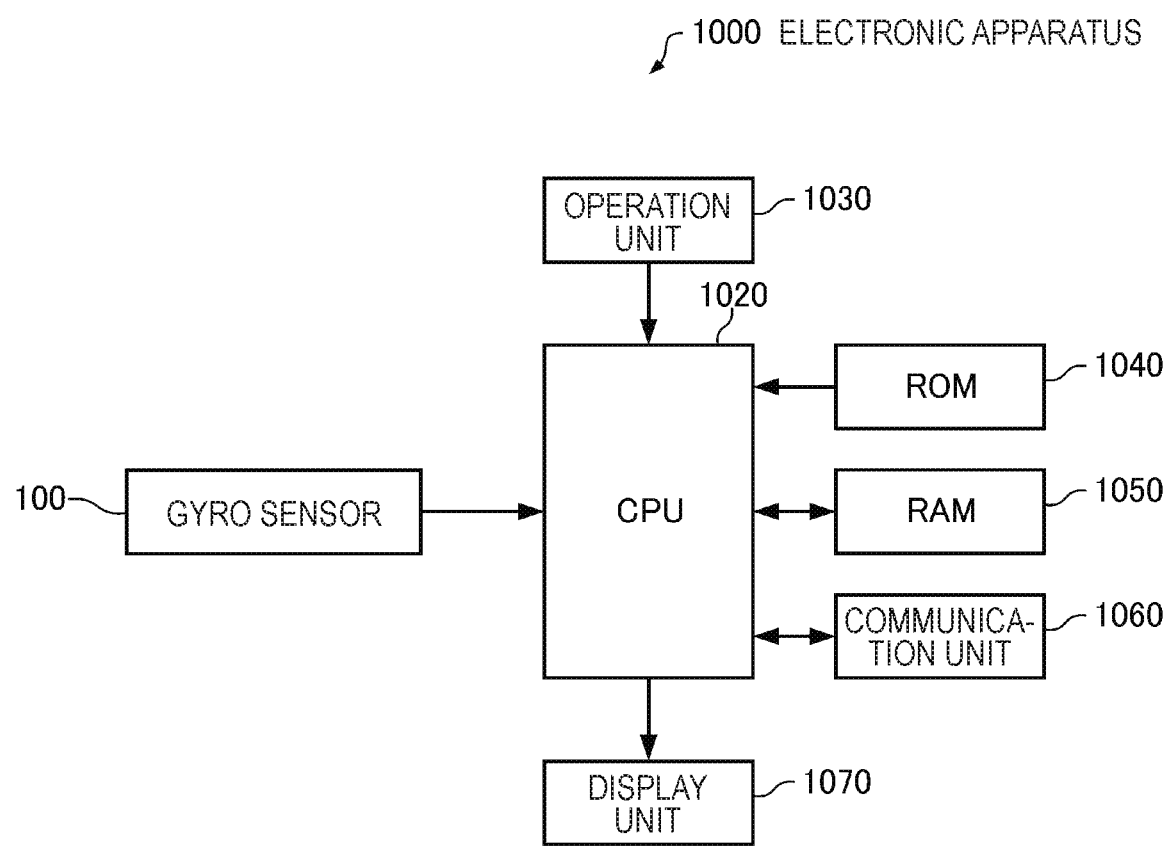
FIG. 9 is a functional block diagram of an electronic apparatus according to an embodiment.

Next, an electronic apparatus according to an embodiment will be described with reference to the drawings. FIG. 9 is a functional block diagram of the electronic apparatus 1000 according to the embodiment.

The electronic apparatus 1000 includes a gyro sensor according to the invention. In the following, the electronic apparatus 1000 including the gyro sensor 100 as a gyro sensor according to the invention will be described.

The electronic apparatus 1000 is configured to further include an arithmetic processing device (CPU) 1020, an operation unit 1030, a read only memory (ROM) 1040, a random access memory (RAM) 1050, a communication unit 1060, and a display unit 1070. In the electronic apparatus of the embodiment, a portion of the constituent elements (parts) in FIG. 9 may be omitted or modified, or other constituent elements may be added.

The arithmetic processing device 1020 performs various calculation processes or control processes according to programs stored in the ROM 1040 or the like. Specifically, the arithmetic processing device 1020 performs various processes in response to an output signal of the gyro sensor 100 or an operation signal from the operation unit 1030, a process for controlling the communication unit 1060 to perform data communication with an external device, a process for transmitting a display signal for causing the display unit 1070 to display various information, and the like.

The operation unit 1030 is an input device including an operation key and a button switch, and outputs an operation signal in response to a user's operation to the arithmetic processing device 1020.

The ROM 1040 stores programs, data, and the like for the arithmetic processing device 1020 to perform various calculation processes or control processes.

The RAM 1050 is used as a working area of the arithmetic processing device 1020, and temporarily stores programs or data read from the ROM 1040, data input from the gyro sensor 100, data input from the operation unit 1030, the results of arithmetic operations executed by the arithmetic processing device 1020 according to the various programs, and the like.

The communication unit 1060 performs various controls for establishing data communication between the arithmetic processing device 1020 and the external device.

The display unit 1070 is a display device including a liquid crystal display (LCD), and displays various information based on the display signal input from the arithmetic processing device 1020. The display unit 1070 may be provided with a touch panel that functions as the operation unit 1030.

Various electronic apparatuses are conceivable as the electronic apparatus 1000. Examples thereof include, for example, a personal computer (e.g., a mobile personal computer, a laptop personal computer, or a tablet personal computer), a mobile terminal such as a smartphone or a mobile phone, a digital still camera, an inkjet ejecting apparatus (e.g., an inkjet printer), a storage area network apparatus such as a router or a switch, a local area network apparatus, a mobile terminal base station apparatus, a television set, a video camcorder, a video recorder, a car navigation system, a real-time clock device, a pager, an electronic notebook (including one with a communication function), an electronic dictionary, a calculator, an electronic game machine, a game controller, a word processor, a workstation, a videophone, a security television monitor, electronic binoculars, a POS terminal, a medical device (e.g., an electronic thermometer, a sphygmomanometer, a blood glucose meter, an electrocardiogram measuring system, an ultrasonic diagnosis device, or an electronic endoscope), a fishfinder, various measuring instruments, gauges (e.g., gauges for a vehicle, aircraft, and a ship), a flight simulator, a head-mounted display, motion tracing, motion tracking, a motion controller, and pedestrian dead reckoning (PDR).

Figure 10:
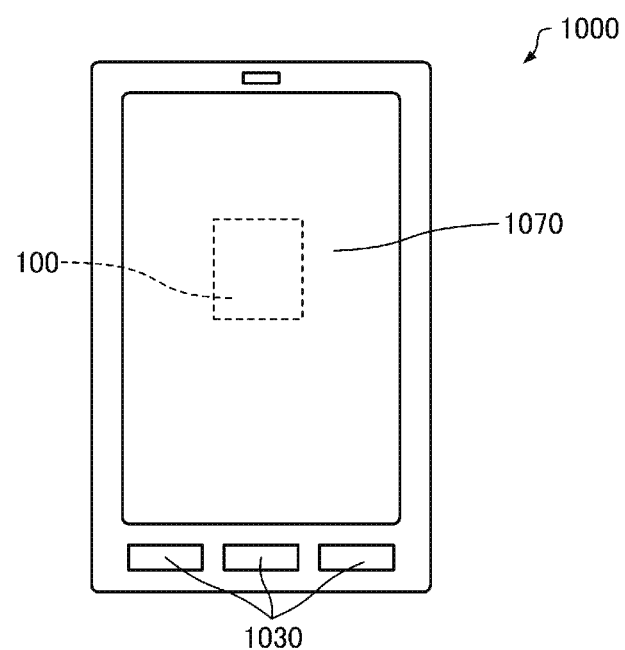
FIG. 10 is a diagram schematically showing an external appearance of a smartphone that is one example of the electronic apparatus according to the embodiment.

FIG. 10 is a diagram showing one example of an external appearance of a smartphone that is one example of the electronic apparatus 1000. The smartphone, which is the electronic apparatus 1000, includes buttons as the operation unit 1030, and an LCD as the display unit 1070.

Figure 11:
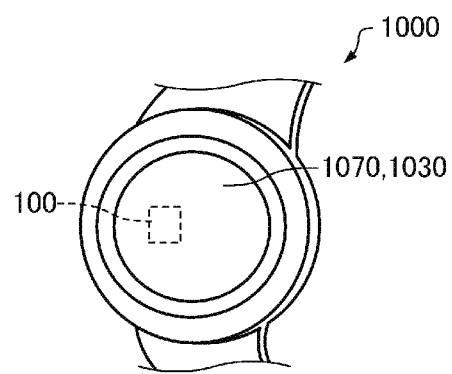
FIG. 11 is a diagram schematically showing an external appearance of a wearable apparatus that is one example of the electronic apparatus according to the embodiment.

FIG. 11 is a diagram showing one example of an external appearance of a wrist-worn portable apparatus (wearable apparatus) that is one example of the electronic apparatus 1000. The wearable apparatus, which is the electronic apparatus 1000, includes an LCD as the display unit 1070. The display unit 1070 may be provided with a touch panel that functions as the operation unit 1030.

The portable apparatus, which is the electronic apparatus 1000, includes, for example, a position sensor such as a global positioning system (GPS) receiver, and can measure the movement distance and movement path of the user.

5. Vehicle

Figure 12:
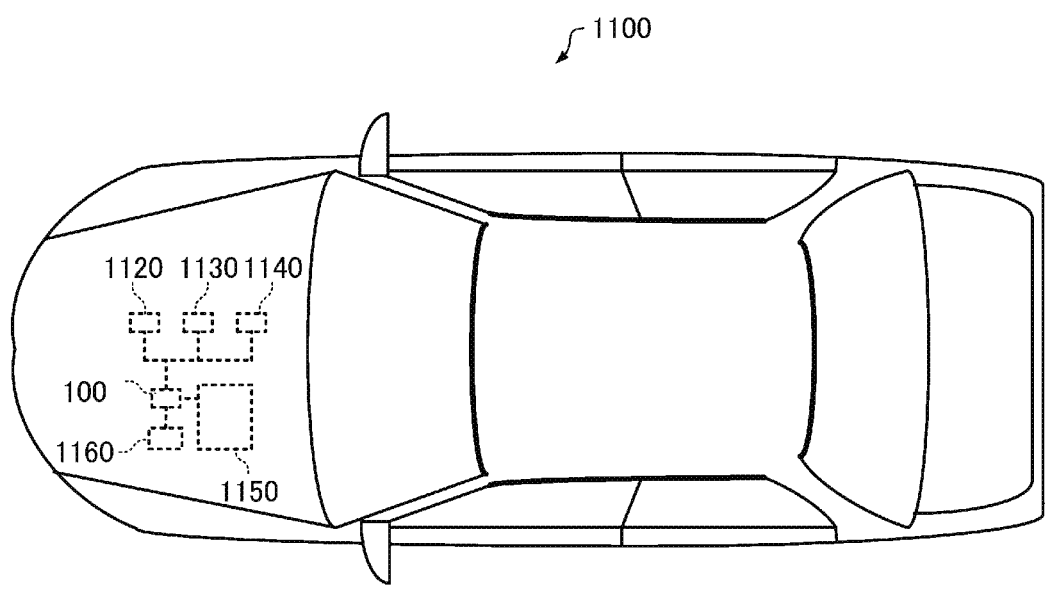
FIG. 12 is a plan view schematically showing a vehicle according to an embodiment.

Next, a vehicle according to an embodiment will be described with reference to the drawing. FIG. 12 is a perspective view schematically showing an automobile as the vehicle 1100 according to the embodiment.

The vehicle according to the embodiment includes a gyro sensor according to the invention. In the following, the vehicle including the gyro sensor 100 as a gyro sensor according to the invention will be described.

The vehicle 1100 according to the embodiment is configured to further include controllers 1120, 1130, and 1140 that perform various controls for an engine system, a brake system, a keyless entry system, and the like, a battery 1150, and a backup battery 1160. In the vehicle 1100 according to the embodiment, a portion of the constituent elements (parts) shown in FIG. 12 may be omitted or modified, or other constituent elements may be added.

Various vehicles are conceivable as the vehicle 1100. Examples thereof include, for example, an automobile (including an electric automobile), aircraft such as a jet plane or a helicopter, a ship, a rocket, and an artificial satellite.

The embodiments and modified example described above are illustrative only, and the invention is not limited to them. For example, each of the embodiments and the modified example can be appropriately combined together.

The invention includes a configuration (e.g., a configuration having the same function, method, and result, or a configuration having the same advantage and advantageous effect) that is substantially the same as any of the configurations described in the embodiments. Moreover, the invention includes a configuration in which a non-essential portion of the configuration described in the embodiments is replaced. Moreover, the invention includes a configuration providing the same operational effects as those described in the embodiments, or a configuration capable of achieving the same advantages. Moreover, the invention includes a configuration in which a publicly known technique is added to the configurations described in the embodiments.

The entire disclosure of Japanese Patent Application No. 2017-028778 filed on Feb. 20, 2017 is expressly incorporated by reference herein.

What is claimed is:

1. A gyro sensor comprising:
an X-axis, a Y-axis, and a Z-axis orthogonal to each other;
a substrate;
a first driver provided on a primary surface of the substrate, the primary surface being orthogonal to the Z-axis;
first and second fixed electrodes disposed on the primary surface of the substrate, the first fixed electrode and the second fixed electrode being aligned along the X-axis;
a first detector and a second detector that are configured to detect angular velocity, the first and second detectors being respectively overlapped with the primary surface of the substrate along the Z-axis, the first detector and the second detector being aligned along the X-axis, the first driver and each of the first and second detectors being aligned along the Y-axis,
the first detector including:
a first movable body including a first movable electrode as a part of the first movable body, the first movable electrode vibrating by vibration of the first driver and being displaced in response to the angular velocity, the first movable electrode being overlapped with the first fixed electrode along the Z-axis, a first capacitance being formed between the first fixed electrode and the first movable electrode, and
the second detector including:
a second movable body including a second movable electrode as a part of the second movable body, the second movable electrode vibrating by the vibration of the first driver and being displaced in response to the angular velocity, the second movable electrode being overlapped with the second fixed electrode along the Z-axis, a second capacitance being formed between the second fixed electrode and the second movable electrode, the first and second movable bodies vibrating in phase with each other;
a first coupling member coupling between the first movable body and the second movable body, the first and second movable bodies and the first coupling member being aligned along the X-axis, a width of the first coupling member along the Y-axis being smaller than each of widths along the Y-axis of the first and second movable bodies;
a first fixed member, a second fixed member, and a third fixed member that are fixed to the substrate;
a first spring coupling the first driver to a central part of a side of the first movable body, the side extending along the X-axis, the side having first and second ends opposite to each other;
a second spring coupling the second fixed member to the first end of the side of the first movable body; and
a third spring coupling the third fixed member to the second end of the side of the first movable body,
wherein the first spring is located between the second spring and the third spring along the X-axis.

2. The gyro sensor according to claim 1,
wherein the first spring has a plurality of first members and second members, the first members extend along the X-axis, the second members extend along the Y-axis, and every one of the first members is connected to another one of the first members via one of the second members,
the first fixed member and a first one of the first members that is closest to the first fixed member are overlapped with each other when viewed along the Y-axis, and
a width along the Y-axis of the first one of the first members is larger than widths along the Y-axis of the other ones of the first members.

3. An electronic apparatus comprising:
the gyro sensor according to claim 2;
an arithmetic processing device that performs arithmetic processing based on an output signal from the gyro sensor; and
a display that displays information in response to control of the arithmetic processing device.

4. A portable electronic apparatus comprising:
the gyro sensor according to claim 2;

an arithmetic processing device that performs arithmetic processing based on an output signal from the gyro sensor;
a communication device that performs data communication with an external device;
an operation device that transmits an operation signal to the arithmetic processing device; and
a display that displays information in response to control of the arithmetic processing device.

5. A vehicle comprising:
the gyro sensor according to claim 2;
at least one of an engine system, a brake system, and a keyless entry system; and
a controller that controls the at least the one of the engine system, the brake system, and the keyless entry system based on an output signal from the gyro sensor.

6. The gyro sensor according to claim 1, wherein
the first movable body and the second movable body have the same size and the same shape.

7. The gyro sensor according to claim 1, further comprising:
a second driver provided on the primary surface of the substrate;
a third movable body and a fourth movable body that vibrate by vibration of the second driver and are displaced in response to the angular velocity; and
a second coupling member coupling between the third movable body and the fourth movable body, the third and fourth movable bodies and the second coupling member being aligned along the X-axis,
wherein the first and second movable bodies and the third and fourth movable bodies vibrate in opposite phase to each other.

8. An electronic apparatus comprising:
the gyro sensor according to claim 1;
an arithmetic processing device that performs arithmetic processing based on an output signal from the gyro sensor; and
a display that displays information in response to control of the arithmetic processing device.

9. A portable electronic apparatus comprising:
the gyro sensor according to claim 1;
an arithmetic processing device that performs arithmetic processing based on an output signal from the gyro sensor;
a communication device that performs data communication with an external device;
an operation device that transmits an operation signal to the arithmetic processing device; and
a display that displays information in response to control of the arithmetic processing device.

10. The portable electronic apparatus according to claim 9, further comprising a GPS receiver, wherein
the portable electronic apparatus measures a movement distance and a movement path of the portable electronic apparatus.

11. A vehicle comprising:
the gyro sensor according to claim 1;
at least one of an engine system, a brake system, and a keyless entry system; and
a controller that controls the at least the one of the engine system, the brake system, and the keyless entry system based on an output signal from the gyro sensor.

* * * * *